(12) United States Patent
You et al.

(10) Patent No.: US 12,358,517 B2
(45) Date of Patent: Jul. 15, 2025

(54) SYSTEM AND METHOD OF CONTROLLING VEHICLE

(71) Applicants: Hyundai Motor Company, Seoul (KR); Kia Corporation, Seoul (KR)

(72) Inventors: Bao Wen You, Shandong (CN); Sun Woo Park, Gyeonggi-do (KR); Young Joon Chang, Gyeonggi-do (KR); Xiaobin Ma, Shandong (CN); Xuejiao Sun, Shandong (CN); Yuzhao Wei, Shandong (CN); Woon Ki Cho, Seoul (KR); Xiao Tong Yan, Shandong (CN)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 244 days.

(21) Appl. No.: 18/078,045

(22) Filed: Dec. 8, 2022

(65) Prior Publication Data
US 2024/0092374 A1     Mar. 21, 2024

(30) Foreign Application Priority Data
Sep. 19, 2022   (CN) .......................... 202211135512.X

(51) Int. Cl.
*B60W 50/038*     (2012.01)
*B60W 10/08*      (2006.01)
*B60W 40/076*     (2012.01)

(52) U.S. Cl.
CPC .......... *B60W 50/038* (2013.01); *B60W 10/08* (2013.01); *B60W 40/076* (2013.01); *B60W 2520/28* (2013.01); *B60W 2710/083* (2013.01)

(58) Field of Classification Search
CPC .. B60W 50/038; B60W 10/08; B60W 40/076; B60W 2520/28; B60W 2710/083; B60W 50/029; B60W 2520/10; B60W 2540/10; B60W 2540/18; B60W 2552/15; B60W 50/0205; B60W 40/06; B60W 40/10; B60L 3/06; B60L 3/12; B60L 15/10; B60L 2240/16; B60L 2240/24; B60L 2240/421;
(Continued)

(56) References Cited

U.S. PATENT DOCUMENTS

2006/0206250 A1*   9/2006   Darvish .............. B60R 21/0132
                                                            701/45
2012/0239290 A1*   9/2012   Fujita ..................... G01C 21/20
                                                            701/430
(Continued)

FOREIGN PATENT DOCUMENTS

CN           113799619 A       12/2021
CN           113815432 A       12/2021
(Continued)

*Primary Examiner* — Mary Cheung
(74) *Attorney, Agent, or Firm* — Fox Rothschild LLP

(57) ABSTRACT

A system of controlling a vehicle may include a sensor and a controller, in which the sensor may be configured to sense vehicle operation state information, and the controller may be configured to determine whether a vehicle is running on a dangerous road based on the sensed vehicle operation state information, determine whether there is a possibility that a vehicle driving state will cause a failure of a driving system based on the sensed vehicle operation state information in response to determining that the vehicle is running on the dangerous road, and decide that torque control of the vehicle.

16 Claims, 9 Drawing Sheets

(58) Field of Classification Search
CPC ......... B60L 2240/423; B60L 2240/461; B60L 2250/10; B60L 2250/16; B60L 2250/26; B60Y 2200/91; B60Y 2300/24; B60Y 2400/90; B60Y 2400/92; Y02T 10/72; Y02T 10/64
See application file for complete search history.

(56) References Cited

U.S. PATENT DOCUMENTS

| 2023/0040552 A1* | 2/2023 | Lee | B60W 50/0098 |
| 2024/0046798 A1* | 2/2024 | Oara | G05D 1/0293 |

FOREIGN PATENT DOCUMENTS

| CN | 215522165 U | * | 1/2022 | | |
| CN | 117794793 A | * | 3/2024 | .............. | B60T 1/062 |
| DE | 102019212668 A1 | * | 2/2021 | ........... | G01S 13/931 |

* cited by examiner

SYSTEM AND METHOD OF CONTROLLING VEHICLE

CROSS-REFERENCE TO RELATED APPLICATION

This application claims under 35 U.S.C. § 119(a) priority to and the benefit of Chinese Patent Application No. 202211135512.X filed in the Chinese National Intellectual Property Administration on Sep. 19, 2022, the entire contents of which are incorporated herein by reference.

BACKGROUND OF THE DISCLOSURE

(a) Field of the Disclosure

The present disclosure relates to a vehicle technology field, and particularly, to a system and a method of controlling a vehicle.

(b) Description of the Related Art

A motor of an electric vehicle (EV) has features of constant torque at a low speed and a constant output at a high speed. When the EV is rapidly accelerated at a low speed, the torque of the EV also rapidly increases and the EV has a large motor torque. In particular, at beginning of EV departure, the EV has a largest motor torque. In general, a fuel vehicle reaches a maximum torque value only when a predetermined time elapsed after departure, and the torque is generally smaller than the torque of the EV. Further, unlike the fuel vehicle, in general, in the EV, a speed-reducer of a fixed gear ratio is used. In the EV, the motor, the speed-reducer, and a wheel are directly and sequentially connected, a transmission is not installed, and simultaneously, a clutch and a torque converter with vibration reduction, energy absorption, and buffering actions are not installed between a driving shaft and the motor. Since the EV also has a larger driving battery than the fuel vehicle, the EV has larger inertia than the fuel vehicle. Therefore, when the EV is driven in a dangerous road, for example, driving systems of the EV such as a power electric (PE) system bracket, a motor shaft, a base, a speed-reducer housing, a motor housing, and a speed-reducer gear can be more easily damaged. For example, when the EV is driven on a bumpy road, the wheel flies to leave the ground, motor resistance force is lost for a while, and an idle is generated such that a rotational speed rapidly increases. When the wheel touches the ground again, a phenomenon occurs in which a vehicle speed is rapidly changed and the speed of the motor rapidly decreases again, the motor resistance force is instantaneously recovered, and an alternative impact load is repetitively applied to a bearing connecting the motor and the wheel, which can influence a use life-span of the motor shaft. In an extreme case, when the EV passes through the bumpy road continuously with a large load, even the fatigue breakdown of the motor shat may be directly caused.

A traction control system (TCS) and an electronic stability controller (ESC) logic in the related art can already reduce the motor torque of the EV, but an operation time is late and when the EV is driven on the dangerous road, the TCS and ESC logic cannot sufficiently protect the driving system due to lack of torque restriction.

Therefore, when the vehicle is driven on the dangerous road, a system and a method of controlling the vehicle are required, which can rapidly reduce the motor torque and restrict the torque in order to protect the driving system of the EV.

The above information disclosed in this Background Art is only for providing convenience of deeply understanding of the technical measures (used technical means, technical problems to be solved, and generated technical effects, etc.) of the present disclosure, and the corresponding information should not be regarded that configuring the existing technologies that may be already known to a person of ordinary skill in the art may be recognized or may be implicated as any form.

SUMMARY OF THE DISCLOSURE

An exemplary embodiment of the present disclosure has been made in an effort to provide a system and a method of controlling a vehicle. According to the system and the method of controlling the vehicle, it may be determined whether a vehicle may be driven on a dangerous road and whether there may be a possibility that a failure of a driving system will be caused in a vehicle driving state, it may be determined whether it may be necessary to control torque of the vehicle according to a determination result, and the vehicle torque may be controlled when the torque of the vehicle may be required to be controlled, thereby preventing hardware damage of the driving system and implementing protection of the driving system.

An exemplary embodiment of the present disclosure provides a system of controlling a vehicle including a sensor and a controller, wherein the sensor may be configured to sense vehicle operation state information and generate sensed vehicle operation state information, and the controller, in communication with the sensor to receive the sensed vehicle operation state information, may be configured to determine whether a vehicle may be running on a dangerous road based on the sensed vehicle operation state information, determine whether there may be a possibility that a vehicle driving state will cause a failure of a driving system based on the sensed vehicle operation state information in response to determining that the vehicle is running on the dangerous road, and decide that torque control of the vehicle is required and control the vehicle torque in response to determining that there is the possibility that the vehicle driving state will cause the failure of the driving system. The sensor may include one or more sensors to generate the sensed vehicle operation state information.

The vehicle operation state information includes at least one of slope information of the road on which the vehicle is running, steering angle information, longitudinal acceleration information, depth information of an acceleration pedal, wheel speed information, vertical acceleration information, vehicle failure information, or any combination thereof.

The controller may be configured to determine that there is the possibility that the vehicle driving state will cause the failure of the driving system when the road slope is smaller than a preset road slope, the steering angle is smaller than a preset steering angle, the longitudinal acceleration is larger than a predetermined longitudinal acceleration, the acceleration pedal depth is deeper than a preset acceleration pedal depth, an average wheel speed difference during a predetermined time interval is smaller than a preset average wheel speed difference during the predetermined time period, the vehicle failure information indicates that the failure of the vehicle does not occur, or any combination thereof.

When controlling the vehicle torque, the controller may be configured to decrease the vehicle torque up to a set value with a predetermined first change rate.

The controller may be configured to increase the vehicle torque with a predetermined second change rate in response to determining that the vehicle may not be running on the dangerous road or determining that there may be no possibility that the vehicle driving state will cause the failure of the driving system after decreasing the vehicle torque to the set value with the predetermined first change rate.

The controller may be configured to calculate an impact amount received in a vehicle driving process, accumulate the calculated impact amount when the calculated impact amount may be equal to or larger than a first set value, and determine that the vehicle may be running on the dangerous road when the accumulated impact amount may be equal to or larger than a second set value.

The controller may be configured to determine that the vehicle may be running on the dangerous road if a holding time of the accumulated impact amount may be smaller than a predetermined time when the accumulated impact amount may be smaller than the second set value.

The controller may be configured to estimate a current wheel speed by using previous wheel speed information and calculate a difference between the estimated current wheel speed and an actual current wheel speed, and set the difference as the impact amount received in the vehicle driving process when calculating the impact amount received in the vehicle driving process.

The controller may be configured to obtain a plurality of wheel speeds with a predetermined frequency within the predetermined time interval and set the obtained wheel speeds as previous wheel speed information, and decide a wheel speed change tendency by using the plurality of obtained wheel speeds to estimate a current wheel speed.

The vehicle operation state information may further includes motor speed information, and when calculating the impact amount received in the vehicle driving process, a current motor speed may be estimated by using previous motor speed information and a difference between the estimated current motor speed and an actual current motor speed may be calculated to set the difference as the impact amount received in the vehicle driving process.

The controller may be configured to determine whether the vehicle may be running on the dangerous road based on vertical acceleration information.

The system of controlling a vehicle further includes a display configured to display a real-time torque change message of the vehicle and a warning message indicating that the vehicle may be running on the dangerous road.

Exemplary embodiments of the disclosure comprises a vehicle in combination with the system of controlling the vehicle including the controller and one or more sensors for generating sensed vehicle operation state information.

Another exemplary embodiment of the present disclosure provides a method of controlling a vehicle including: sensing vehicle operation state information; determining whether a vehicle is running on a dangerous road based on the sensed vehicle operation state information; determining whether there is a possibility that a vehicle driving state will cause a failure of a driving system based on the sensed vehicle operation state information in response to determining that the vehicle is running on the dangerous road; and deciding that torque control of the vehicle is required and controlling the vehicle torque in response to determining that there is the possibility that the vehicle driving state will cause the failure of the driving system.

The vehicle operation state information may include the slope information of the road on which the vehicle is running, the steering angle information, the longitudinal acceleration information, the depth information of an acceleration pedal, the wheel speed information, the vertical acceleration information, the vehicle failure information, or any combination thereof.

The determining of whether there is the possibility that the vehicle driving state will cause the failure of the driving system based on the sensed vehicle operation state information includes determining that there is the possibility that the vehicle driving state will cause the failure of the driving system when the road slope is smaller than a preset road slope, the steering angle is smaller than a preset steering angle, the longitudinal acceleration is larger than a predetermined longitudinal acceleration, the acceleration pedal depth is deeper than a preset acceleration pedal depth, an average wheel speed difference during a predetermined time interval is smaller than a preset average wheel speed difference value during the predetermined time interval, the vehicle failure information indicates that the failure of the vehicle does not occur, or any combination thereof.

The controlling of the vehicle torque includes decreasing the vehicle torque to a set value with a predetermined first change rate.

The controlling of the vehicle torque includes increasing the vehicle torque with a predetermined second change rate in response to determining that the vehicle is not running on the dangerous road or determining that there is no possibility that the vehicle driving state will cause the failure of the driving system after decreasing the vehicle torque to the set value with the predetermined first change rate.

The determining of whether the vehicle is running on the dangerous road based on the sensed vehicle operation state information includes calculating an impact amount received in a vehicle driving process, accumulating the calculated impact amount when the calculated impact amount is equal to or larger than a first set value, and determining that the vehicle is running on the dangerous road when the accumulated impact amount is equal to or larger than a second set value.

The determining of whether the vehicle is running on the dangerous road based on the sensed vehicle operation state information includes determining that the vehicle is running on the dangerous road if a holding time of the accumulated impact amount is smaller than a predetermined time when the accumulated impact amount is smaller than the second set value.

The calculating of the impact amount received in the vehicle driving process includes estimating a current vehicle wheel speed by using previous wheel speed information, and calculating a difference between the estimated current wheel speed and an actual current wheel speed and setting the calculated difference as an impact amount received in the vehicle driving process.

The estimating of the current wheel speed by using the previous wheel speed information includes obtaining a plurality of wheel speeds with a predetermined frequency within the predetermined time interval and setting the obtained wheel speeds as previous wheel speed information, and deciding a wheel speed change tendency by using the plurality of obtained wheel speeds to estimate the current wheel speed.

The vehicle operation state information further includes motor speed information, and the calculating of the impact amount received in the vehicle driving process includes estimating a current motor speed by using previous motor speed information, and calculating a difference between the estimated current motor speed and an actual current motor speed and setting the calculated difference as the impact amount received in the vehicle driving process.

The determining of whether the vehicle is running on the dangerous road based on the sensed vehicle operation state information includes determining whether the vehicle is running on the dangerous road based on vertical acceleration information.

The method of controlling a vehicle further includes displaying a real-time torque change message of the vehicle and a warning message indicating that the vehicle is running on the dangerous road.

The present disclosure uses the technical method and has the following beneficial effects. When the vehicle is running on the dangerous road, and there is the possibility that the vehicle driving state will cause the failure of the driving system, the torque is rapidly reduced and restricted to decrease load of the driving system, thereby protecting the hardware of the driving system according to the system and the method of controlling the vehicle. Further, according to the system and the method of controlling a vehicle, the strength of the driving system is increased to prevent hardware damage of the driving system. Using a hardware with a larger model is not required, and there is no damage to the driving system, so vehicle development cost may be reduced and a vehicle development is not delayed. The increase and the decrease of the torque are controlled according to the predetermined first change rate and the predetermined second change rate, so a driver and a passenger do not feel abnormal acceleration and deceleration, and as a result, a ride comfort may be enhanced.

BRIEF DESCRIPTION OF THE DRAWINGS

Hereinafter, exemplary embodiments of the present disclosure will be described in more detail with reference to the accompanying drawings. For clear description, in different drawings, the same member is denoted by the same reference numeral. The drawings are just exemplary, and not particularly drawn according to a ratio.

DETAILED DESCRIPTION OF THE EMBODIMENTS

Figure 1:
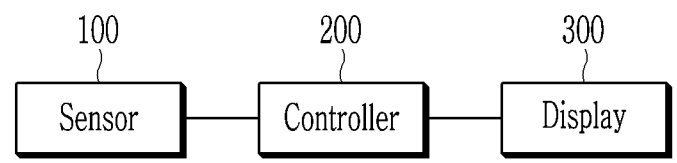
FIG. 1 is a block diagram illustrating a configuration of a system of controlling a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like.

Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

Hereinafter, an exemplary embodiment of the present disclosure will be described in detail, and the exemplary embodiment will be implemented by premising the technical method of the present disclosure, and a detailed exemplary embodiment and a specific operation process may be opened, but the technical scope of the present disclosure may not be limited the following exemplary embodiment.

FIG. 1 is a block diagram illustrating a configuration of a system of controlling a vehicle according to an exemplary embodiment of the present disclosure. As illustrated in FIG. 1, the vehicle control system according to an exemplary embodiment of the present disclosure includes a sensor 100, a controller 200, and a display 300. The sensor 100 may be configured to sense vehicle operation state information. The controller 200 may be configured to determine whether a vehicle may be running on a dangerous road based on the sensed vehicle operation state information, determine whether there may be a possibility that a vehicle driving state will cause a failure of a driving system based on the sensed vehicle operation state information in response to determining that the vehicle may be running on the dangerous road, and determine that vehicle torque may be required to be controlled and control the vehicle torque in response to determining that there may be the possibility that the vehicle driving state will cause the failure of the driving system. The display 300 may be configured to display a real-time torque change message of the vehicle and a warning message indicating that the vehicle may be running on the dangerous road.

According to an exemplary embodiment of the present disclosure, the vehicle control system determines whether the vehicle may be running on the dangerous road; determines whether there may be the possibility that the vehicle driving state will cause the failure (specifically, damage) of the driving system; and when it may be determined that the vehicle torque may be required to be controlled according to a determination result (e.g., the vehicle may be running on the dangerous road and there may be the possibility that the vehicle driving state will cause the failure of the driving system), controls the vehicle torque to prevent hardware damage of the driving system and implementing protection of the driving system.

According to an exemplary embodiment of the present disclosure, the sensor 100 may sense the vehicle operation state information. The vehicle operation state information may include slope information of the road on which the vehicle may be running, steering angle information, longitudinal acceleration information, depth information of an accelerator pedal, wheel speed information, vertical acceleration information, and/or failure information of the vehicle. The sensor 100 may include various sensors capable of sensing the vehicle operation state information.

In an exemplary embodiment, a slope sensor may be used to detect a slope of the road on which the vehicle may be running. A steering angle sensor may be used to detect a steering angle of the vehicle. A longitudinal acceleration may mean an acceleration in a driving direction of the vehicle, and may be detected by a longitudinal acceleration sensor. An accelerator pedal position sensor may be used to detect a depth of the accelerator pedal. A wheel speed sensor may be used to detect a wheel speed. A vertical acceleration sensor may be used to detect a vertical acceleration of the vehicle. A sensor for detecting whether a vehicle failure indication lamp may be turned on may be used to sense whether the vehicle has the failure.

Further, the vehicle operation state information may further include motor speed information, sleep or braking information of the vehicle, and information on whether the vehicle may be currently accelerated. In an exemplary embodiment, a motor speed sensor may be used to detect a motor speed. A brake pedal position sensor may be used to detect sleep or the braking of the vehicle. The information on whether the vehicle may be currently accelerated may be decided through the depth information of the accelerator pedal, the sleep or braking information of the vehicle, and the longitudinal acceleration information.

According to an exemplary embodiment of the present disclosure, the controller 200 may determine whether the vehicle may be running on the dangerous road based on the sensed vehicle operation state information. According to an exemplary embodiment of the present disclosure, the controller 200 may be configured to determine whether the vehicle may be running on the dangerous road based on the wheel speed information included in the sensed vehicle operation state information.

Figure 2:
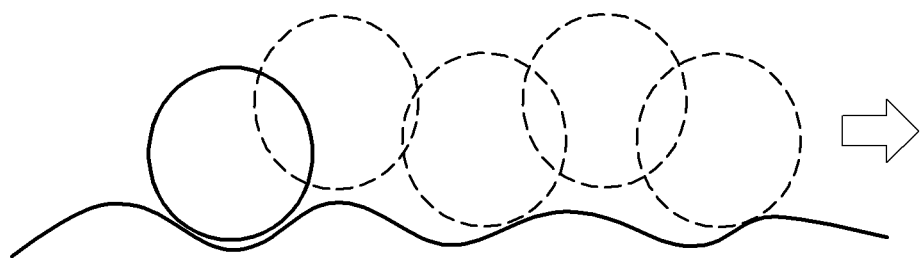
FIG. 2 is a schematic view illustrating a detailed movement trajectory of a wheel on a road when a vehicle passes through a dangerous road.

FIG. 2 is a schematic view illustrating a detailed movement trajectory of a wheel on a road when a vehicle passes through a dangerous road. As illustrated in FIG. 2, when the vehicle passes on the dangerous road, the wheel repeatedly circulates an operation situation of "grounding state-flying state-grounding state . . . -grounding state".

The controller 200 may be configured to receive the wheel speed information from the sensor 100. According to a characteristics when the vehicle passes on the dangerous road, when the wheel flies and leaves the ground, the wheel speed may rapidly increase. The controller 200 may be configured to calculate and monitor the wheel speed in real time, and estimate a current wheel speed (i.e., a current wheel speed when the wheel does not leave the ground) by using previous wheel speed information (i.e., a wheel speed during a predetermined period before the speed rapidly increases by the wheel flying). A detailed estimation process may be as follows. The wheel speed may be sampled and recorded at each sampling point (a sampling frequency may be generally a maximum allowable frequency in the wheel speed sensor) by using the wheel speed sensor within a predetermined time interval. Linear estimation may be performed according to a constant speed, acceleration, or deceleration tendency based on the wheel speed at the sampling points recorded within the predetermined time interval. That is, the current wheel speed may be estimated according to a previous wheel speed change tendency (e.g., an inclination and a numerical value size between any two sampling points, etc.). Each sampling point should be calculated within the predetermined time interval, and the scheme described above may be repeated. The controller 200 may be configured to obtain an actual current wheel speed (that is, a rapidly increased wheel speed as the wheel flies and leaves the ground, and this may be obtained by sampling and recording for each sampling point by using the wheel speed sensor). According to the characteristics when the vehicle passes on the dangerous road, the wheel speed rapidly decreases upon the wheel grounding. Similarly to the scheme described above, the controller 200 may be configured to estimate the current wheel speed (i.e., a current wheel speed when it may be assumed that the wheel grounding does not occur) by using the previous wheel speed information (i.e., a wheel speed before the wheel may be grounded and the wheel speed rapidly decreases), and the controller 200 may be configured to obtain the actual current wheel speed (i.e., the rapidly decreased wheel speed when the wheel may be grounded).

Through the above-described processes, the controller 200 may be configured to calculate a difference between the estimated current wheel speed and the actual current wheel speed and set the difference as an impact amount received in the vehicle driving process. That is, the impact amount may be calculated through the following equation.

Impact amount=|Vestimation−Vactual|

When the calculated impact amount is equal to or larger than a first set value, the calculated impact amount (i.e., an absolute value of the difference of the estimated current wheel speed and the actual current wheel speed) is accumulated. The first set value is a reference value used for detecting one impact amount for determining whether the vehicle is running on the dangerous road. The vehicle control system according to an exemplary embodiment of the present disclosure should protect the driving system of the vehicle not to be damaged while the vehicle repeats the wheel flying and grounding process on the dangerous road. Therefore, the vehicle control system uses the first set value as the reference value to exclude an impact amount received when the vehicle turns, when the vehicle climbs a ramp, when the vehicle passes through stagnant water, an icy road, or a manhole cover, etc., thereby preventing an error and enhancing accuracy of the determination.

Correspondingly, when the calculated impact amount is smaller than the first set value, the calculated impact amount is not accumulated. Additionally, when the accumulated impact amount is equal to or larger than a second set value, it is determined that the vehicle is running on the dangerous road. The second set value is a reference value used for detecting an accumulation value of the impact amount for determining whether the vehicle is running on the dangerous road.

When the accumulated impact amount is smaller than the second set value, it is determined whether a holding time of the accumulated impact amount is smaller than a predetermined time. When the holding time of the accumulated impact amount is smaller than the predetermined time, the controller 200 may be configured to determine that the vehicle is running on the dangerous road. The predetermined time is a reference value used for detecting the holding time of the accumulation value of the impact amount for determining whether the vehicle is running on the dangerous road. When the vehicle beings to pass on the dangerous road, the vehicle flies and leaves the ground, and the motor resistance force is temporarily lost. However, the motor torque may still be continuously output, the vehicle may be idling, and the wheel speed rapidly increases. In this case, the impact amount received by the vehicle may be one maximum impact amount received when the vehicle passes on the dangerous road. Even though a total impact amount received by the vehicle does not reach the second set value, even when the holding time may be short, specifically, when the holding time may be smaller than the predetermined time, it may be determined that the vehicle may be running on the dangerous road.

Here, the first set value, the second set value, and the predetermined time may be repeatedly adjusted according to an actual situation in a vehicle development stage.

According to another exemplary embodiment of the present disclosure, the controller 200 may be configured to determine whether the vehicle may be running on the dangerous road based on the motor speed information included in the sensed vehicle operation state information. In the electric vehicle, the motor speed and the wheel speed have a fixed proportion relationship. Correspondingly, when the impact amount received in the vehicle driving process may be calculated, the current motor speed may be estimated by using the previous motor speed information. A detailed process of estimating the current motor speed may be similar to the detailed process of estimating the current wheel speed. The difference between the estimated current motor speed and the actual current motor speed may be calculated and may be then set as the impact amount received in the vehicle driving process.

According to another exemplary embodiment of the present disclosure, the controller 200 may be configured to determine whether the vehicle is running on the dangerous road based on the vertical acceleration information included in the vehicle operation state information. In an exemplary embodiment, when a size of the vertical acceleration or a change rate of the size exceeds a predetermined threshold, it may be determined that vibration occurs in the vehicle in a vertical direction, and as a result, it may be determined that the vehicle is running on the dangerous road.

Further, when the controller 200 may be configured to determine that the vehicle is running on the dangerous road, the controller 200 may be configured to send a warning message indicating that the vehicle is running on the dangerous road on the display 300, which may be then displayed on the display 300.

According to an exemplary embodiment of the present disclosure, the controller 200 may be configured to determine whether there is the possibility that the vehicle driving state will cause the failure of the driving system based on the sensed vehicle operation state information in response to determining that the vehicle is running on the dangerous road.

When determining whether there may be the possibility that the vehicle driving state will cause the failure of the driving system based on the sensed vehicle operation state information, the controller 200 may be configured to first determine whether an approval of a user is obtained. The vehicle control system according to an exemplary embodiment of the present disclosure may provide an input device for receiving a control command from the user, and the user may determines whether to start a function to determine whether there may be the possibility that the vehicle driving state will cause the failure of the driving system.

The input device may include a button, and additionally include a mouse, a keyboard, a touch screen, a microphone, a joystick, a jog shuttle, a stylus pen, etc. Further, an interface device may additionally include a soft key implemented on the display.

When determining that the approval of the user is obtained, the controller 200 may be configured to determine whether there is the possibility that the vehicle driving state will cause the failure of the driving system based on the sensed vehicle operation state information again. Here, the vehicle operation state information may include the slope information of the mad on which the vehicle is running, the steering angle information, the longitudinal acceleration information, the depth information of the accelerator pedal, the sleep or braking information of the vehicle, the wheel speed information, the vehicle failure information, the information on whether the vehicle being accelerated, or any combination thereof.

When the road slope is smaller than a preset road slope, the steering angle is smaller than a preset steering angle, the longitudinal acceleration is larger than a predetermined longitudinal acceleration, the accelerator pedal depth is deeper than a preset accelerator pedal depth, an average wheel speed difference during the predetermined time interval is smaller than a preset average wheel speed difference during the predetermined time interval, or the vehicle failure information indicates that the failure of the vehicle does not occur, it is determined that there is the possibility that the vehicle driving state will cause the failure of the driving system.

Here, the preset road slope, the preset steering angle, the preset longitudinal acceleration, the preset accelerator pedal depth, and the preset average wheel speed difference during the predetermined time interval may be repeatedly adjusted based on an actual situation in the vehicle development stage.

Further, the preset accelerator pedal depth may be set so that a determination result that the accelerator pedal depth may be deeper than the preset accelerator pedal depth may preemptively determine that the vehicle may be accelerated.

According to an exemplary embodiment of the present disclosure, the controller 200 may determine that the vehicle torque may be required to be controlled and control the vehicle torque in response to determining that there may be the possibility that the vehicle driving state will cause the failure of the driving system.

Figure 3A:
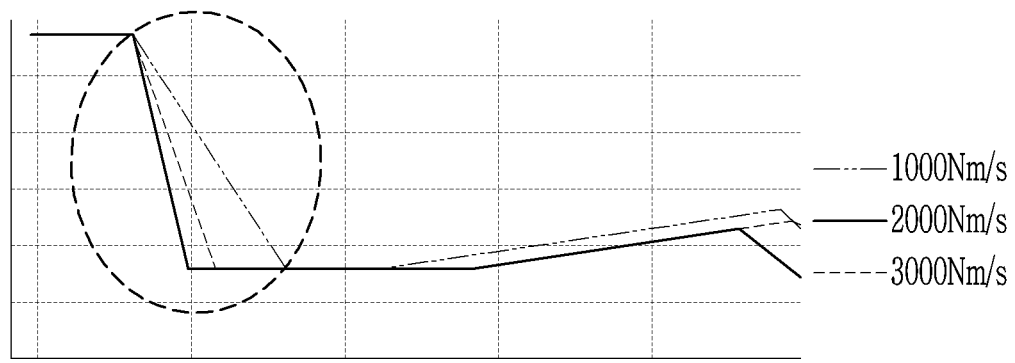
FIG. 3A is a schematic view illustrating that vehicle torque is decreased to a set value according to three different predetermined first change rates.

When controlling the vehicle torque, the controller 200 decreases the vehicle torque to a set value with a predetermined first change rate. FIG. 3A is a schematic view illustrating that the vehicle torque is decreased to a set value according to three different predetermined first change rates. As illustrated in FIG. 3A, when the predetermined first change rate is equal to 1000 Nm/s, a protection effect for the driving system is insufficient, but a passenger may not feel abnormal vibration. When the predetermined first change rate is equal to 3000 Nm/s, the protection effect for the driving system is sufficient, but the passenger may certainly feel the vibration. When the predetermined first change rate is equal to 2000 Nm/s, the protection effect for the driving system is sufficient and the passenger does not feel the vibration. Therefore, the predetermined first change rate may be set to approximately 2000 Nm/s. Further, the set value may be 30%, 50%, or 70% of the maximum torque.

The controller 200 increases the vehicle torque with a predetermined second change rate in response to determining that the vehicle is not running on the dangerous road or determining that there is no possibility that the vehicle driving state will cause the failure of the driving system after decreasing the vehicle torque to the set value with the predetermined first change rate. When it is determined that the vehicle is not running on the dangerous road or it is determined that there is no possibility that the vehicle driving state will cause the failure of the driving system, this means that the torque restriction for the vehicle should be cancelled and the vehicle torque should be gradually increased.

Figure 3B:
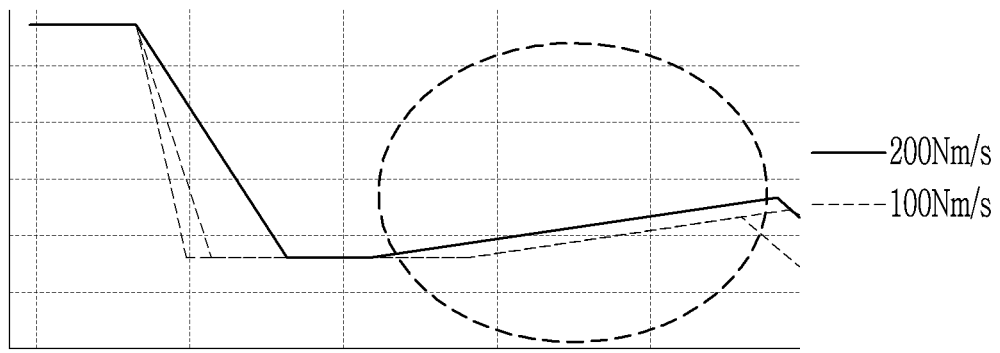
FIG. 3B is a schematic view illustrating that vehicle torque is increased according to two different predetermined second change rates.

FIG. 3B is a schematic view illustrating that the vehicle torque increases according to two different predetermined second change rates. As illustrated in FIG. 3B, when the predetermined second change rate is equal to 100 Nm/s, the acceleration is smooth and a passenger does not feel abnormality. When the predetermined second change rate is equal to 200 Nm/s, the acceleration is too fast, so the passenger may feel abnormal acceleration. Therefore, the predetermined second change rate may be set to approximately 100 Nm/s.

Here, the set value, the predetermined first change rate and the predetermined second change rate may be adjusted according to the actual vehicle speed and a motor parameter.

Therefore, in an exemplary embodiment of the present disclosure, the increase and the decrease of the torque may be controlled according to the predetermined first change rate and the predetermined second change rate. Therefore, a driver and the passenger do not feel abnormal acceleration and deceleration, and as a result, a ride comfort may be enhanced.

According to an exemplary embodiment of the present disclosure, the display 300 may display the real-time torque change message of the vehicle and the warning message indicating that the vehicle may be running on the dangerous road.

Figure 4:
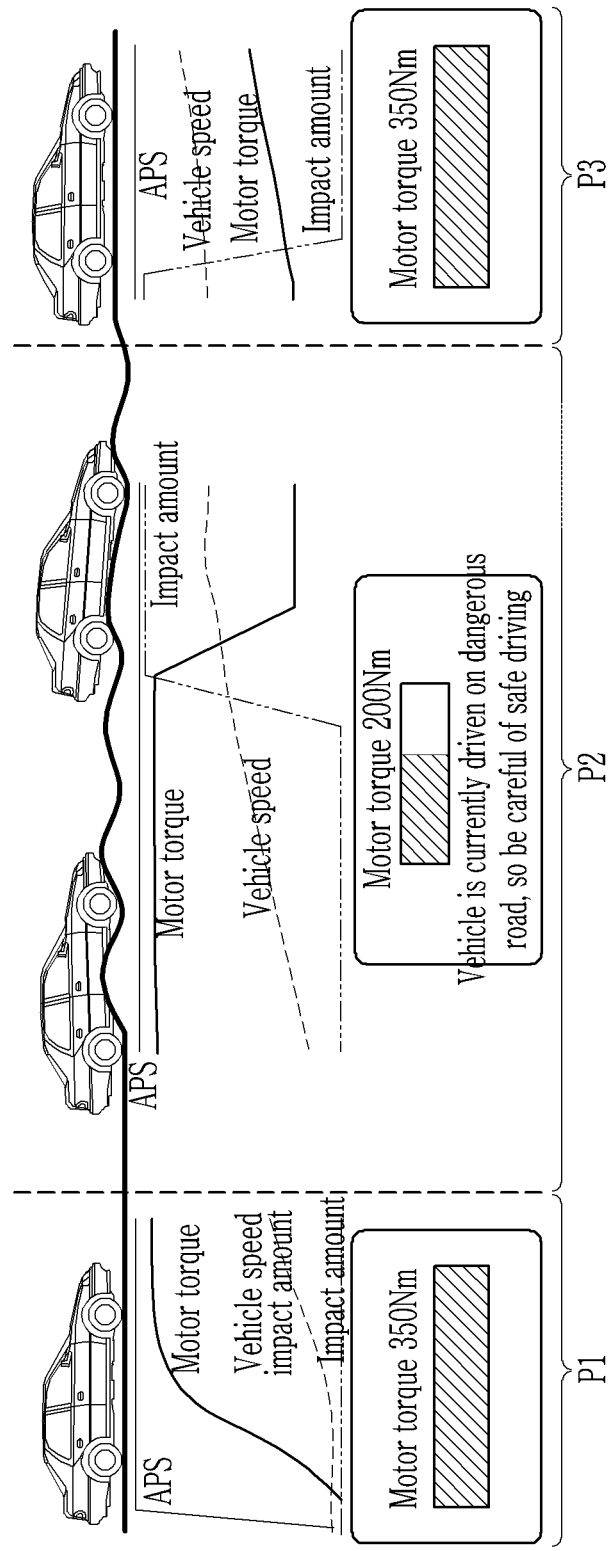
FIG. 4 is a schematic view illustrating that a real-time torque change message of a vehicle in a road driving process of the vehicle and a warning message indicating that the vehicle is driven on a dangerous road are displayed on a display.

FIG. 4 is a schematic view illustrating that the real-time torque change message of the vehicle in the road driving process of the vehicle and the warning message indicating that the vehicle may be running on the dangerous road may be displayed on the display. Each curve in FIG. 4 shows each of the accelerator pedal depth sensed through an accelerator pedal position sensor (APS), the motor torque, the impact amount, and the vehicle speed.

In stage P1, the vehicle may be running on a normal road, the driver steps on the accelerator pedal with a maximum pressure, and the motor torque may be maximally output. The motor torque illustrated in FIG. 4 is 350 Nm, and the impact amount may be 0 and may not be changed, but held.

In stage P2, when the vehicle begins to enter the dangerous road, the impact amount rapidly increases, and then may not be changed, but maintained. Through this, it may be rapidly determined that the vehicle may be running on the dangerous road. By setting stepping on the accelerator pedal with the maximum pressure as one of the determination conditions, the controller 200 determines that there may be the possibility that the vehicle driving state will cause the failure of the driving system. When the vehicle torque may be required to be controlled, the motor torque may be decreased to the set value with the predetermined first change rate, and then the motor torque may be restricted and held to the set value. The motor torque illustrated in FIG. 4 is 200 Nm. Further, the message "Vehicle may be currently running on dangerous road, so be careful of safe driving" may be displayed on the display 300 to remind the driver.

In stage P3, when the vehicle already enters the normal road by passing through the dangerous road, the impact amount decreases to 0 and the restriction of the motor torque may be cancelled. In addition, the motor torque may be recovered with the predetermined second change rate to prevent the passenger and the driver from being inconvenienced due to the rapid acceleration of the vehicle. As illustrated in FIG. 4, the motor torque may be recovered to 350 Nm. Further, a warning for the dangerous road may be turned off.

According to an exemplary embodiment of the present disclosure, when the vehicle may be running on the dangerous road, the vehicle control system decreases a load of the driving system to protect the hardware of the driving system and increases the strength of the driving system to prevent hardware damage of the driving system.

Figure 5:
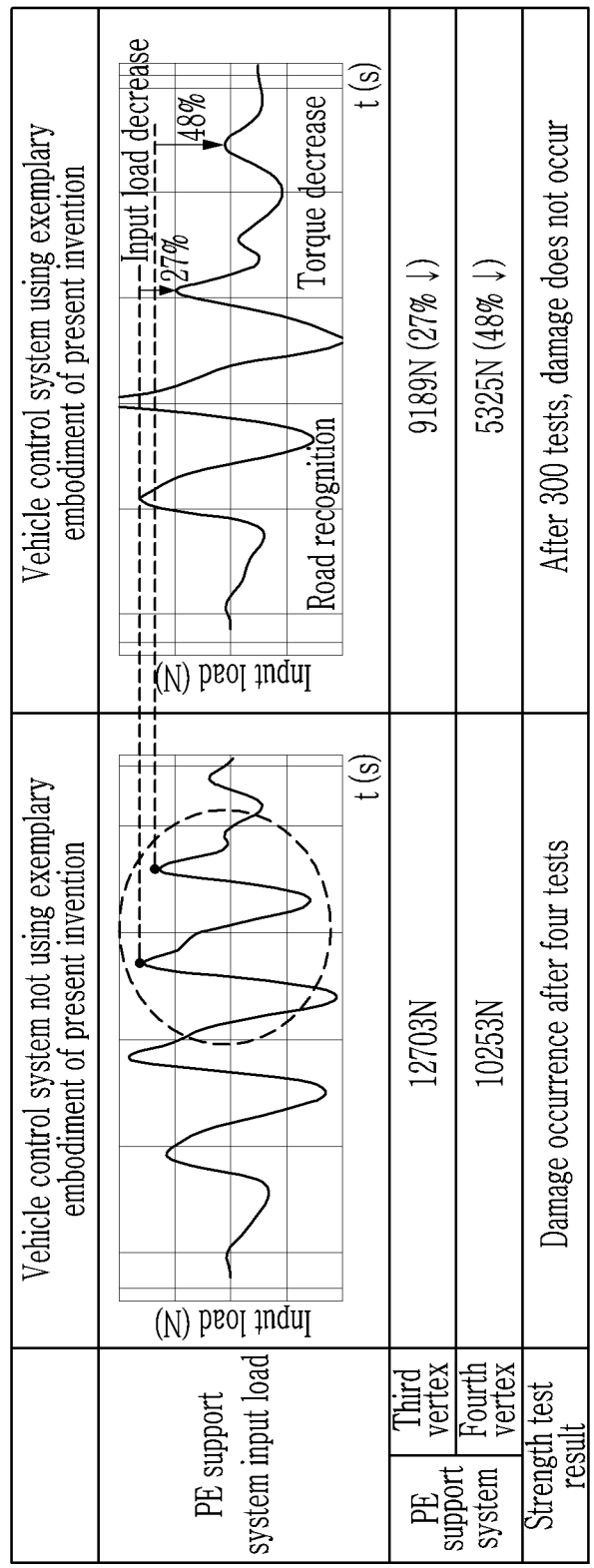
FIG. 5 is a comparison chart showing an input load when a vehicle passes through a speed bump when a vehicle control system according to an exemplary embodiment of the present disclosure is used and is not used.

FIG. 5 is a comparison chart showing an input load when the vehicle passes through a speed bump when the vehicle control system according to an exemplary embodiment of the present disclosure may be used and may not be used. As illustrated in FIG. 5, when the vehicle control system according to an exemplary embodiment of the present disclosure may be provided, an input load of a power electric (PE) support system may be decreased by approximately 30% to 50%. Further, in hundreds of vehicle tests, the hardware damage of the driving system may not occur.

Figure 6:
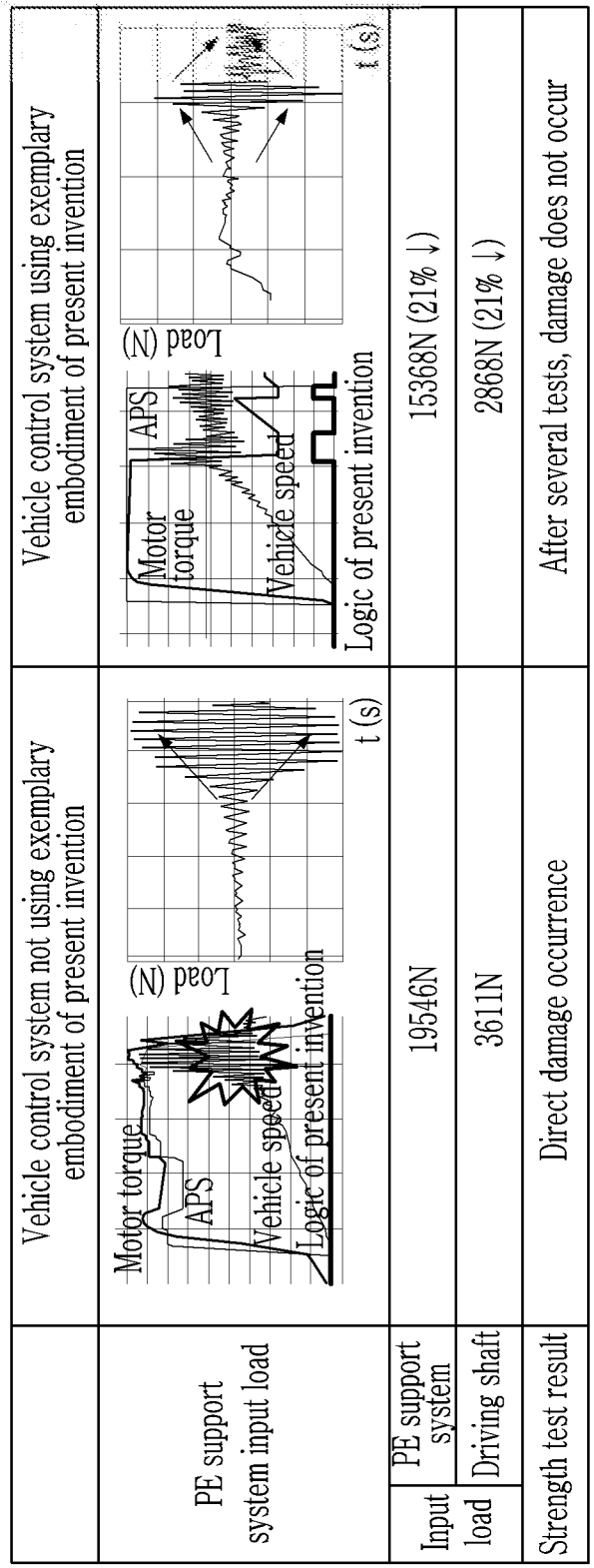
FIG. 6 is a comparison chart showing a torque and a load of a driving shaft when the vehicle passes through a bumpy road when a vehicle control system according to an exemplary embodiment of the present disclosure is used and is not used.

FIG. 6 is a chart showing a comparison of a torque and a load of a driving shaft when the vehicle passes through a bumpy road when the vehicle control system according to an exemplary embodiment of the present disclosure may be used and may not be used. As illustrated in FIG. 6, when the vehicle control system according to an exemplary embodiment of the present disclosure may be provided, the torque and the load of the driving shaft may be decreased by approximately 20%. Further, in several vehicle tests, the hardware damage of the driving system may not occur.

Further, after the vehicle control system according to an exemplary embodiment of the present disclosure may be used, using a hardware with a larger model may not be required, and there may be no damage to the driving system, so vehicle development cost may be reduced and a vehicle development may not be delayed.

Figure 7:
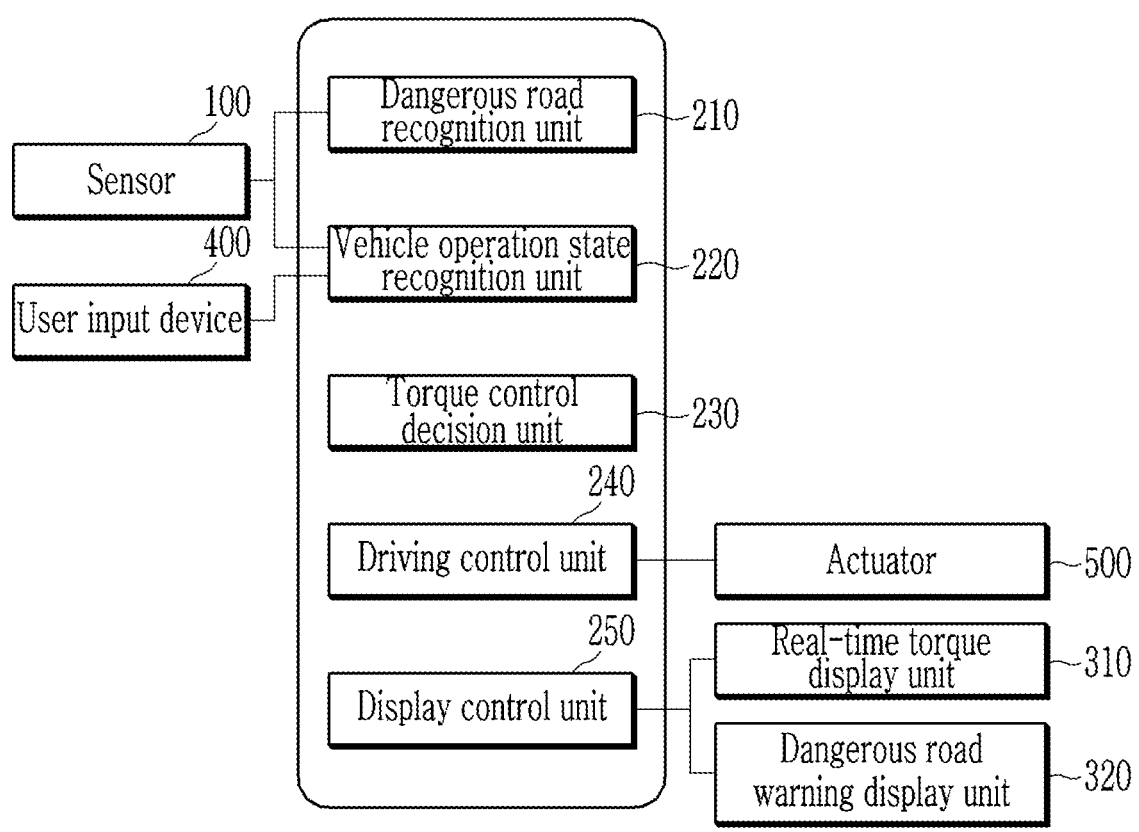
FIG. 7 is a block diagram illustrating a detailed configuration of a system of controlling a vehicle according to an exemplary embodiment of the present disclosure.

FIG. 7 is a block diagram illustrating a detailed configuration of the system of controlling a vehicle according to an exemplary embodiment of the present disclosure. As illustrated in FIG. 7, the vehicle control system according to an exemplary embodiment of the present disclosure may be a system mounted on the vehicle, and prevent the hardware damage of the driving system by automatically recognizing the dangerous road and whether the failure of the driving system occurs and controlling the torque.

The sensor 100 may include, for example, various sensors capable of sensing the vehicle operation state information, which include the wheel speed sensor, the slope sensor, the steering angle sensor, the longitudinal acceleration sensor, the accelerator pedal position sensor, the vertical acceleration sensor, etc. The controller 200 may include a control unit for processing various information. The sensor 100 sends the sensed information to a dangerous road recognition unit 210, and the dangerous road recognition unit 210 determines whether the vehicle may be running on the dangerous road at that time based on the received vehicle operation state information. A vehicle operation state recognition unit 220 determines whether there may be the possibility that the vehicle driving state will cause the failure of the driving system based on the received vehicle operation state information. A user input device 400 may be used for obtaining the approval of the user for the start of the vehicle operation state recognition unit 220.

When the vehicle operation state recognition unit 220 determines that there may be the possibility that the vehicle driving state will cause the failure of the driving system, a torque control decision unit 230 determines the torque control may be required, the torque control decision unit 230 sends a signal indicating that it may be determined that the torque control may be required to a driving control unit 240, and the driving control unit 240 controls an actuator 500 of the vehicle to perform the corresponding torque control.

Further, a display control unit 250 controls a real-time torque display unit 310 to display the real-time torque change message of the vehicle, and controls a dangerous road warning display unit 320 to display the warning message for announcing that the vehicle may be running on the dangerous road, thereby reminding the driver.

In an exemplary embodiment, the dangerous road recognition unit 210, the vehicle operation state recognition unit 220, the torque control decision unit 230, the driving control unit 240, and the display control unit 250 may be installed in a vehicle control unit (VCU), the actuator 500 may be installed in a motor control unit (MCU), and the real-time torque display unit 310 and the dangerous road warning display unit 320 may be installed in a cluster.

Figure 8:
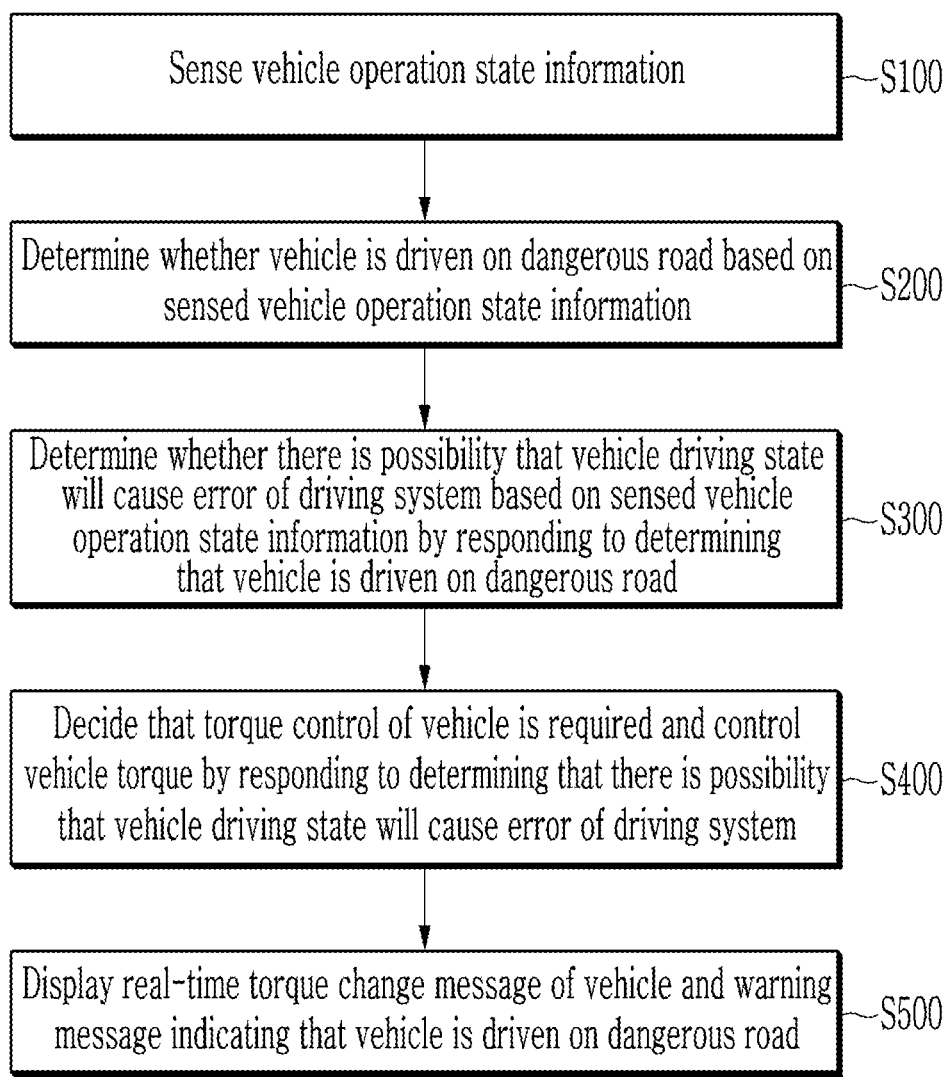
FIG. 8 is a flowchart illustrating a method of controlling a vehicle according to an exemplary embodiment of the present disclosure.
Figure 9:
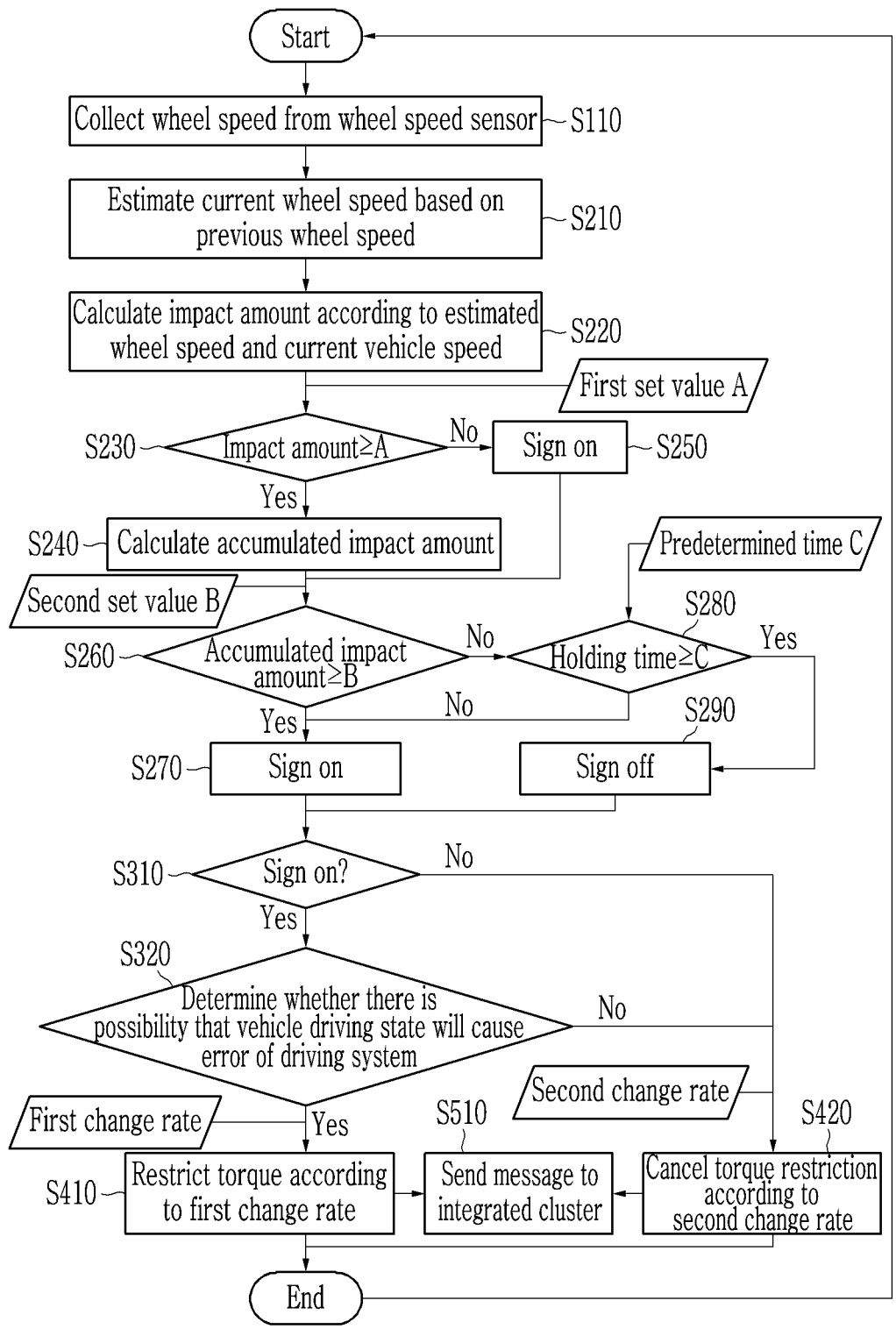
FIG. 9 is a schematic view illustrating one example of a method of controlling a vehicle according to an exemplary embodiment of the present disclosure.

FIG. 8 is a flowchart illustrating a method of controlling a vehicle according to an exemplary embodiment of the present disclosure. FIG. 9 may be a schematic view illustrating one example of the method of controlling a vehicle according to the exemplary embodiment of the present disclosure.

Referring to FIGS. 8 and 9, a vehicle control method according to an exemplary embodiment of the present disclosure includes sensing the vehicle operation state information at step S100; determining whether the vehicle is running on the dangerous road based on the sensed vehicle operation state information at step S200; determining whether there is the possibility that the vehicle driving state will cause the failure of the driving system based on the sensed vehicle operation state information in response to determining that the vehicle is running on the dangerous road at step S300; deciding that the torque control of the vehicle is required and controlling the vehicle torque in response to determining that there is the possibility that the vehicle driving state will cause the failure of the driving system at step S400; and displaying the real-time torque change message of the vehicle and the warning message indicating that the vehicle is running on the dangerous road at step S500.

At the step S100, the vehicle operation state information may include the slope information of the road on which the vehicle is running, the steering angle information, the longitudinal acceleration information, the depth information of the acceleration pedal, the wheel speed information, the vertical acceleration information, and the vehicle failure information.

Since the wheel speed information may be sensed by using the wheel speed sensor, the wheel speed information may be collected from the wheel speed sensor at step S110.

The determining of whether the vehicle is running on the dangerous road based on the sensed vehicle operation state information at the step S200 includes estimating the current wheel speed by using the previous wheel speed information at step S210. Specifically, a plurality of wheel speeds is obtained with a predetermined frequency within the predetermined time interval and set as the previous wheel speed information. A wheel speed change tendency is decided by using the plurality of obtained wheel speeds to estimate the current wheel speed. The difference between the estimated current wheel speed and the actual current wheel speed is calculated and set as the impact amount received in the vehicle driving process at step S220.

It is determined whether the calculated impact amount is equal to or larger than the first set value A at step S230, and when the calculated impact amount is equal to or larger than the first set value A ("Yes" at the step S230), the calculated impact amount is accumulated at step S240. When the calculated impact amount is smaller than the first set value A ("No" at the step S230), the calculated impact amount is not accumulated, and it is just indicated that the calculated impact amount is small at step S250.

It is determined whether the accumulated impact amount is equal to or larger than the second set value B at step S260, and when the accumulated impact amount is equal to or larger than the second set value B ("Yes" at the step S260), it is determined that the vehicle is running on the dangerous road, and a sign indicating that the vehicle is running on the dangerous road is ON at step S270.

When the accumulated impact amount is smaller than the second set value B ("No" at the step S260), it is additionally determined whether the holding time of the accumulated impact amount is equal to or more than the predetermined time C at step S280. When the holding time of the accumulated impact amount is smaller than the predetermined time C ("No" at the step S280), it is determined that the vehicle is running on the dangerous road, and the sign indicating that the vehicle is running on the dangerous road is ON at the step S270.

When the accumulated impact amount is smaller than the second set value B ("No" at the step S260) and when the holding time of the accumulated impact amount is equal to or larger than the predetermined time C ("Yes" at the step S280), it is determined that the vehicle is not running on the dangerous road, and the sign indicating that the vehicle is running on the dangerous road is OFF at step S290.

Subsequently, it is determined whether the sign indicating that the vehicle is running on the dangerous road is ON at step S310, and when the sign indicating that the vehicle is running on the dangerous road is ON ("Yes at the step S310), it is determined whether there is the possibility that the vehicle driving state will cause the failure of the driving system at step S320.

The determining of whether there is the possibility that the vehicle driving state will cause the failure of the driving system based on the sensed vehicle operation state information in response to determining that the vehicle is running on the dangerous road at the step S300 includes determining whether the approval of the user is obtained. When it is determined that the approval of the user is obtained, the step S300 includes determining that there is the possibility that the vehicle driving state will cause the failure of the driving system ("Yes" at the step S320) when the road slope is smaller than the preset road slope, the steering angle is smaller than the preset steering angle, the longitudinal acceleration is larger than the predetermined longitudinal acceleration, the acceleration pedal depth is deeper than the preset acceleration pedal depth, the average wheel speed difference during the predetermined period is smaller than the preset average wheel speed difference during the predetermined period, and the vehicle failure information indicates that the failure of the vehicle does not occur.

The controlling of the vehicle torque at the step S400 includes decreasing the vehicle torque to the set value with the predetermined first change rate and restricting the torque at step S410.

The controlling of the vehicle torque additionally includes increasing the vehicle torque with the predetermined second change rate and canceling the torque restriction at step S420 in response to determining that the vehicle is not running on the dangerous road ("No" at the step S310) or determining that there is no possibility that the vehicle driving state will cause the failure of the driving system ("No" at the step S320) after decreasing the vehicle torque to the set value with the predetermined first change rate at the step S420.

Further, the real-time torque information of the vehicle may be sent to the cluster and displayed on the cluster at step S510.

When the vehicle is running on the dangerous road and there is the possibility that the vehicle driving state will cause the failure of the driving system, the system and the method of controlling the vehicle according to an exemplary embodiment of the present disclosure rapidly reduce the torque, restrict the torque to protect the hardware of the driving system by decreasing a load of the driving system, and prevent hardware damage of the driving system by increasing the strength of the driving system.

In the system and the method of controlling the vehicle according to an exemplary embodiment of the present disclosure, using the hardware with the larger model may not be required, and there may be no damage to the driving system, so the vehicle development cost may be reduced and the vehicle development may not be delayed.

In the system and the method of controlling the vehicle according to an exemplary embodiment of the present disclosure, the increase and the decrease of the torque may be controlled according to the predetermined first change rate and the predetermined second change rate, so the driver and the passenger do not feel abnormal acceleration and deceleration, and as a result, the ride comfort may be enhanced.

Figure 10:
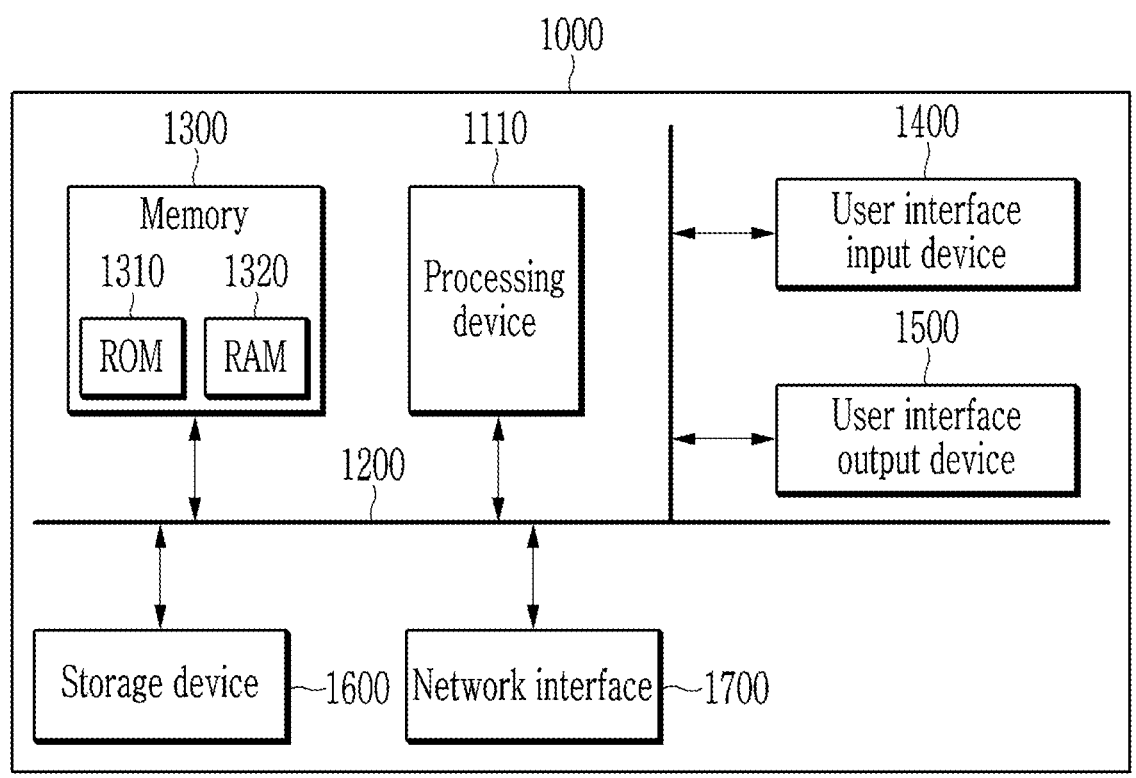
FIG. 10 illustrates a computer system according to an exemplary embodiment of the present disclosure.

FIG. 10 illustrates a computer system according to an exemplary embodiment of the present disclosure. Referring to FIG. 10, a computer system 1000 includes at least one processing device 1100, a memory 1300, a user interface input device 1400, a user interface output device 1500, a storage device 1600, and a network interface 1700 connected to each other through a bus 1200.

The processing device 1100 may be a central processing unit (CPU) or a semiconductor device executing processing a command stored in the memory 1300 and/or the storage device 1600. The memory 1300 and the storage device 1600 may various types of volatile or non-volatile storage medium. For example, the memory 1300 may include a read-only memory (ROM) 1310 and a random access memory (RAM) 1320.

Correspondingly, a hardware, a software module executed by the processing device 1100, or a combination of both directly implements the method or algorithm step described in the exemplary embodiment disclosed in the specification. The software module may be stored in the storage medium (i.e., the memory 1300 and/or the storage device 1600), e.g., a RAM, a flash memory, a ROM, an EPROM, an EEPROM, a register, a hard disk, a mobile disk, and a CD-ROM.

An exemplary storage medium may be connected to the processing device 1100, and the processing device 1100 may read information from the storage medium and record the information to the storage medium. Alternatively, the storage medium may be integrated with the processing device 1100. The processing device and the storage medium may be present in an application specific integrated circuit (ASIC). The ASIC may be present in a terminal of the user. Alternatively, the processing device and the storage medium as independent assemblies may be present in the user terminal.

In various exemplary embodiments of the present disclosure, all combinations may not be listed, but a representative embodiment of the present disclosure may be described, and contents described as various exemplary embodiments may be applied independently or two or more combinations.

The description of the exemplary embodiment may be just for describing the technical method of the present disclosure, and should not be regarded to be complete, and further, the present disclosure may not be limited to a described accurate form. Of course, it may be apparent that various modifications and changes may be made according to the disclosure by an ordinary technician in the art. The selection of an exemplary embodiment may be to be interpreted by the specific principle of the present disclosure and the actual application of the present disclosure, so that the person with the knowledge of the present field may use each embodiment of the present disclosure and the different alternative forms and modifications thereof. The scope of the present disclosure may be limited by the appended claims and a form equivalent thereto.

What is claimed is:

1. A system of controlling a vehicle, the system comprising a sensor and a controller,
    wherein the sensor is configured to sense a vehicle operation state to generate sensed vehicle operation state information, and
    the controller is configured to:
        determine whether a vehicle is running on a dangerous road based on the sensed vehicle operation state information,
        determine whether there is a possibility that a vehicle driving state will cause a failure of a driving system based on the sensed vehicle operation state information in response to determining that the vehicle is running on the dangerous road, and
        decide that torque control of the vehicle is required and control the vehicle torque in response to determining that there is the possibility that the vehicle driving state will cause the failure of the driving system;
    wherein the controller is further configured to decrease the vehicle torque to a set value with a predetermined first change rate when the vehicle torque is controlled, and
    wherein the controller is further configured to increase the vehicle torque with a predetermined second change rate in response to determining that the vehicle is not running on the dangerous road or determining that there is no possibility that the vehicle driving state will cause the failure of the driving system after decreasing the vehicle torque to the set value with the predetermined first change rate.

2. The system of claim 1, wherein the sensor comprises one or more sensors to generate the sensed vehicle operation state information comprising a road slope, a steering angle, a longitudinal acceleration, an acceleration pedal depth, an average wheel speed difference, or a combination thereof, and the controller and wherein the controller is configured to determine that there is the possibility that the vehicle driving state will cause the failure of the driving system when the road slope is smaller than a preset road slope, the steering angle is smaller than a preset steering angle, the longitudinal acceleration is larger than a predetermined longitudinal acceleration, the acceleration pedal depth is deeper than a preset acceleration pedal depth, the average wheel speed difference during a predetermined time interval is smaller than a preset average wheel speed difference during the predetermined time interval, vehicle failure information indicates that the failure of the vehicle does not occur, or a combination thereof.

3. The system of claim 1, wherein the controller is configured to:
    calculate an impact amount received in a vehicle driving process,
    accumulate the calculated impact amount when the calculated impact amount is equal to or larger than a first set value, and
    determine that the vehicle is running on the dangerous road when the accumulated impact amount is equal to or larger than a second set value.

4. The system of claim 3, wherein the controller is configured to determine that the vehicle is running on the dangerous road when a holding time of the accumulated impact amount is smaller than a predetermined time when the accumulated impact amount is smaller than the second set value.

5. The system of claim 3, wherein the vehicle operation state information comprises wheel speed information, and wherein the controller is configured to estimate a current wheel speed by using previous wheel speed information, calculate a difference between the estimated current wheel speed and an actual current wheel speed, and set the difference as the impact amount received in the vehicle driving process when calculating the impact amount received in the vehicle driving process.

6. The system of claim 3, wherein the vehicle operation state information further includes motor speed information, and
    wherein a current motor speed is estimated by using previous motor speed information and a difference between the estimated current motor speed and an actual current motor speed is calculated to set the difference as the impact amount received in the vehicle driving process when calculating the impact amount received in the vehicle driving process.

7. The system of claim 1, wherein the controller is configured to determine whether the vehicle is running on the dangerous road based on vertical acceleration information.

8. The system of claim 1, further comprising a display configured to display a real-time torque change message of the vehicle and a warning message indicating that the vehicle is running on the dangerous road.

9. A method of controlling a vehicle, the method comprising:
    sensing vehicle operation state information;
    determining whether a vehicle is running on a dangerous road based on the sensed vehicle operation state information;
    determining whether there is a possibility that a vehicle driving state will cause a failure of a driving system based on the sensed vehicle operation state information in response to determining that the vehicle is running on the dangerous road; and
    deciding that torque control of the vehicle is required and controlling the vehicle torque in response to determining that there is the possibility that the vehicle driving state will cause the failure of the driving system;
    wherein the controlling of the vehicle torque further includes decreasing the vehicles torque to a set value with a predetermined first change rate, and
    wherein the controlling of the vehicle torque further includes increasing the vehicle torque with a predetermined second change rate in response to determining that the vehicle is not running on the dangerous road or determining that there is no possibility that the vehicle driving state will cause the failure of the driving system after decreasing the vehicle torque to the set value with the predetermined first change rate.

10. The method of claim 9, wherein the determining of whether there is the possibility that the vehicle driving state will cause the failure of the driving system based on the sensed vehicle operation state information includes,
  determining that there is the possibility that the vehicle driving state will cause the failure of the driving system when a road slope is smaller than a preset road slope, a steering angle is smaller than a preset steering angle, a longitudinal acceleration is larger than a predetermined longitudinal acceleration, an acceleration pedal depth is deeper than a preset acceleration pedal depth, an average wheel speed difference during a predetermined time interval is smaller than a preset average wheel speed difference during the predetermined time interval, and vehicle failure information indicates that the failure of the vehicle does not occur.

11. The method of claim 9, wherein the determining of whether the vehicle is running on the dangerous road based on the sensed vehicle operation state information includes,
  calculating an impact amount received in a vehicle driving process,
  accumulating the calculated impact amount when the calculated impact amount is equal to or larger than a first set value, and
  determining that the vehicle is running on the dangerous road when the accumulated impact amount is equal to or larger than a second set value.

12. The method of claim 11, wherein the determining of whether the vehicle is running on the dangerous road based on the sensed vehicle operation state information includes, determining that the vehicle is running on the dangerous road when a holding time of the accumulated impact amount is smaller than a predetermined time when the accumulated impact amount is smaller than the second set value.

13. The method of claim 11, wherein the calculating of the impact amount received in the vehicle driving process includes,
  estimating a current vehicle wheel speed by using previous wheel speed information, and
  calculating a difference between the estimated current wheel speed and an actual current wheel speed and
  setting the calculated difference as an impact amount received in the vehicle driving process.

14. The method of claim 11, wherein the vehicle operation state information further includes motor speed information, and
  wherein the calculating of the impact amount received in the vehicle driving process includes,
  estimating a current motor speed by using previous motor speed information, and
  calculating a difference between the estimated current motor speed and an actual current motor speed and setting the calculated difference as the impact amount received in the vehicle driving process.

15. The method of claim 9, wherein the determining of whether the vehicle is running on the dangerous road based on the sensed vehicle operation state information includes, determining whether the vehicle is running on the dangerous road based on vertical acceleration information.

16. The method of claim 9, further comprising displaying a real-time torque change message of the vehicle and a warning message indicating that the vehicle is running on the dangerous road.

* * * * *